United States Patent [19]

Takahashi et al.

[11] Patent Number: 5,592,559
[45] Date of Patent: Jan. 7, 1997

[54] SPEAKER DRIVING CIRCUIT

[75] Inventors: Ryutaro Takahashi; Toru Hayase, both of Higashihiroshima, Japan

[73] Assignee: Sharp Kabushiki Kaisha, Osaka, Japan

[21] Appl. No.: 920,888

[22] Filed: Jul. 28, 1992

[30] Foreign Application Priority Data

| Aug. 2, 1991 | [JP] | Japan | 3-193982 |
| Aug. 7, 1991 | [JP] | Japan | 3-197709 |
| Jun. 12, 1992 | [JP] | Japan | 4-153630 |

[51] Int. Cl.⁶ .................................. H04R 3/00
[52] U.S. Cl. ................................. 381/111
[58] Field of Search ............... 381/117, 116, 381/111, 120; 307/262; 330/10

[56] References Cited

U.S. PATENT DOCUMENTS

| 3,679,844 | 7/1972 | Derkacz | 381/196 |
| 4,360,707 | 11/1982 | Joseph et al. | |
| 4,464,785 | 8/1984 | Kagdis | 381/117 |
| 4,509,101 | 4/1985 | Kenji | 330/10 |
| 4,566,120 | 1/1986 | Nieuwendjk et al. | 381/117 |
| 4,797,932 | 1/1989 | Rohulich et al. | 381/109 |
| 5,055,708 | 10/1991 | Sugawara | 307/270 |
| 5,077,540 | 12/1991 | Keith et al. | 330/10 |
| 5,079,551 | 1/1992 | Kimura | 375/28 |
| 5,347,587 | 9/1994 | Takahashi et al. | 381/111 |

FOREIGN PATENT DOCUMENTS

| 0019027 | 2/1983 | Japan | 318/117 |
| 0181897 | 10/1984 | Japan | 381/116 |
| 59-194596 | 11/1984 | Japan . | |
| 241199 | 9/1990 | Japan . | |
| 2068680 | 8/1981 | United Kingdom . | |

OTHER PUBLICATIONS

"Possibility for Developing PCM Digital Speaker" (JAS Journal, Jan. 82, Japan).

Primary Examiner—Curtis Kuntz
Assistant Examiner—Ping W. Lee
Attorney, Agent, or Firm—Nixon & Vanderhye P.C.

[57] ABSTRACT

A speaker driving circuit including a switch which switches the supplying of current to a speaker on and off by using a binary pulse-density-modulated (PDM) signal produced by $\Delta\Sigma$-modulating a digital audio signal from a digital low-pass filter. For example, when the PDM signal is "1", the switch causes the output current of the direct-current power source to flow to the voice coil. On the other hand, when the PDM signal is "0", the switch stops the current to flow to the voice coil. This switch may be replaced with a switch which switches the direction of current flowing through the voice coil. The diaphragm of the speaker is driven by controlling the supplying of current in such a manner. With this arrangement, since a D/A converter for a digital audio signal is not required, there is no need to install an amplification circuit for an analog signal. Thus, the speaker driving circuit has a simplified structure but is capable of driving the speaker stably.

8 Claims, 6 Drawing Sheets

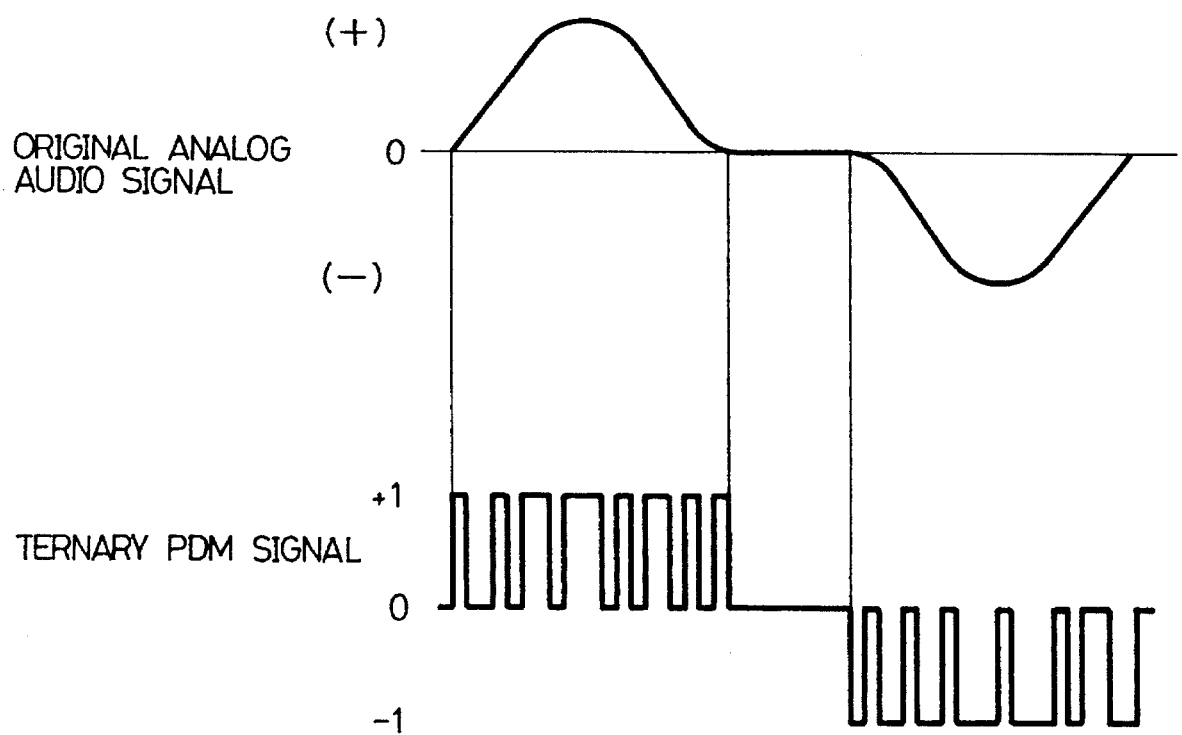

SPEAKER DRIVING CIRCUIT

FIELD OF THE INVENTION

The present invention relates to a speaker driving circuit which drives a speaker by controlling the application of a voltage to a voice coil in accordance with a digital audio signal.

BACKGROUND OF THE INVENTION

When reproducing a digital audio signal with a conventional speaker, the digital audio signal is first converted into an analog audio signal via a digital low-pass filter by a digital/analog converter (hereinafter referred to as D/A converter). Next, the analog audio signal is amplified via an analog low-pass filter by an amplification circuit with variable gain, and is then input to the voice coil of the speaker.

In the speaker, a DC magnetic field is produced all the time at the magnetic gap in a magnetic circuit, including a yoke with a magnet pole and a plate. Therefore, when the analog audio signal is input to the voice coil that is placed to cross the DC magnetic field, a diaphragm is driven by force generated according to the Fleming's left-hand rule.

With this driving method, however, a D/A converter for converting a digital audio signal into an analog audio signal is essential. In the case of using the D/A converter, in order to obtain a satisfactory analog signal, a digital low-pass filter of an over-sampling type and a higher-order analog filter must be installed before and after the D/A converter, respectively. This method, therefore, causes the structure of the speaker driving circuit to become complicated and the manufacturing costs to increase.

Moreover, to drive the diaphragm of the speaker, the analog signal obtained by D/A conversion must be amplified with an amplification circuit. The amplification circuit produces a large amount of heat during amplification. Hence, problems arise, namely, the operations of circuits other than the amplification circuit become unstable and the consumption of power increases.

SUMMARY OF THE INVENTION

An object of the present invention is to provide a speaker driving circuit which has a simplified structure but is capable of performing stable operations by digitally processing signals.

In order to achieve the above objective, a speaker driving circuit of the present invention incorporates a direct-current power source for supplying a current to the voice coil of a speaker, a $\Delta\Sigma$ modulator for $\Delta\Sigma$-modulating a digital audio signal, and a binary switch for controlling the supplying of a current to the voice coil in accordance with the digital audio signal from the $\Delta\Sigma$ modulator.

In the speaker driving circuit, the digital audio signal is converted into a binary digit (0 or 1) through $\Delta\Sigma$-modulation by the $\Delta\Sigma$ modulator. Then, the binary switch is activated in accordance with the binary signal. For example, in the case where the binary switch is designed to switch the supplying of the current between on and off in accordance with the binary signal, the current is stopped from flowing when the binary signal is "0" and it is directed to the voice coil when the binary signal is "1". In the case where the binary switch is designed to switch the direction of current flowing through the voice coil in accordance with the binary signal, the current flows in the positive direction when the binary signal is "0", while it flows in the negative direction when the binary signal is "1". With the use of such a switch, the diaphragm of the speaker is driven in proportional to an analog audio signal. At this time, the diaphragm functions as an acoustic low-pass filter and the binary signal is reproduced as an analog audio signal.

In order to achieve the above objective, another speaker driving circuit of the present invention incorporates a direct-current power source for supplying a current to the voice coil of a speaker, a $\Delta\Sigma$ modulator for $\Delta\Sigma$-modulating a digital audio signal, a ternary pulse-density modulator for converting the $\Delta\Sigma$-modulated digital audio signal into a ternary pulse-density-modulated signal, and a ternary pulse-density-modulation switch for controlling the supply of a current to the voice coil in accordance with the ternary pulse-density-modulated signal.

In this speaker driving circuit, the digital audio signal is firstly $\Delta\Sigma$-modulated and converted into a binary digit by the $\Delta\Sigma$ modulator and then converted into the ternary PDM (pulse-density-modulated) signal represented as +1, 0, or −1 by the ternary pulse-density modulator. The ternary pulse-density-modulation switch is activated in accordance with the ternary signal.

For example, when the PDM signal is "+1", a positive output voltage of the direct-current power source is applied to the voice coil and a current flows. When the PDM signal is "0", the current does not flow to the voice coil. And, when the PDM signal is "−1", a negative output voltage of the direct-current power source is applied to the voice coil and the current flows.

Thus, similar to the above-mentioned binary signal, the ternary PDM signal is reproduced as sound because the diaphragm of the speaker functions as an acoustic low-pass filter.

The PDM signal tends to be zero when the amplitude of the corresponding analog signal is nearly zero. Therefore, this speaker driving circuit performs power-efficient digital-to-analog conversion by controlling the supply of the current.

The speaker driving circuit may be configured with a ternary pulse-width modulator and a ternary pulse-width-modulation switch, instead of the ternary pulse-density modulator and the ternary pulse-density-modulation switch. The ternary pulse-width modulator converts the $\Delta\Sigma$-modulated digital audio signal into a ternary pulse-width modulated signal. The ternary pulse-width-modulation switch controls the supplying of current to the voice coil by controlling the output of the direct-current power source in accordance with the ternary pulse-width-modulated signal.

In such a speaker driving circuit, the supply of the current is controlled by the ternary pulse-width-modulation switch which is activated by the ternary PWM (pulse-width-modulated) signal (+1, 0 or −1) produced by the ternary pulse-width modulator. Like the above-mentioned circuit, since the PWM signal tends to be zero when the amplitude of the corresponding analog signal is nearly zero, power-efficient digital-to-analog conversion is performed in this speaker driving circuit.

Still another speaker driving circuit of the present invention has either the structures of the above-mentioned respective speaker driving circuits and is capable of varying the output voltage of the direct-current power source.

In the speaker driving circuit, the amount of current flowing to the voice coil is changed by varying the output voltage of the direct-current power source. This arrangement enables the volume of the reproduced sound to be adjusted.

As described above, since the speaker driving circuit of the present invention switches the supplying of the current to the voice coil on and off in accordance with a binary or ternary signal, a D/A converter and an amplification circuit are not required. Therefore, it is possible to reduce the manufacturing costs of the speaker driving circuit and to decrease the production of heat significantly. As a result, a stable circuit operation is maintained with a lower energy consumption.

For a fuller understanding of the nature and advantages of the invention, reference should be made to the ensuing detailed description taken in conjunction with the accompanying drawings.

BRIEF DESCRIPTION OF THE DRAWINGS

FIG. 7 is a view illustrating the waveforms of an original audio signal and a ternary PDM signal produced by the speaker driving circuit of FIG. 5.

DESCRIPTION OF THE EMBODIMENTS

A first embodiment of the present invention is described below with reference to FIGS. 1 through 4.

Figure 1:
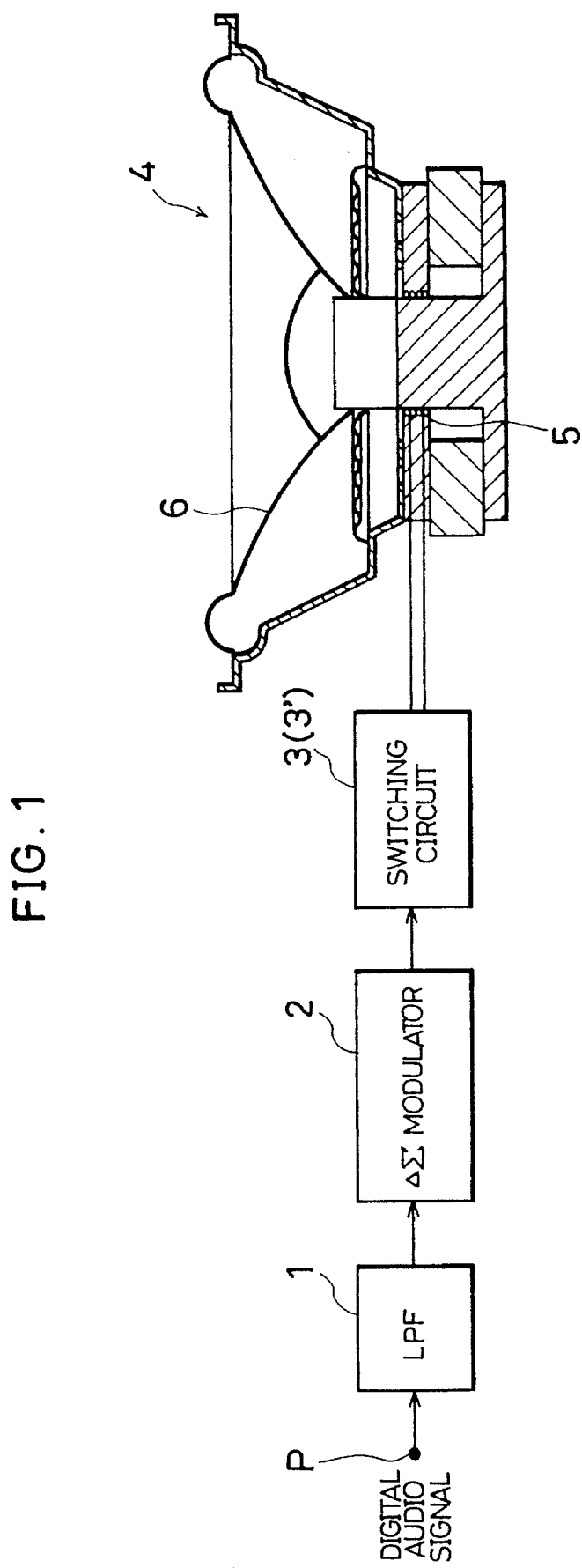
FIG. 1 is a block diagram schematically illustrating the structure of a speaker driving circuit according to the first embodiment of the present invention.

As illustrated in FIG. 1, a speaker driving circuit of this embodiment includes a digital low-pass filter 1 (indicated as LPF in the drawing), a $\Delta\Sigma$ modulator 2, and a switching circuit 3.

In order to move folded noise components to higher frequency ranges, the digital low-pass filter 1 over-samples a digital audio signal at a high sampling frequency.

The $\Delta\Sigma$ modulator 2 converts the digital audio signal transmitted from the digital low-pass filter 1 into a one-bit binary PDM (pulse-density-modulated) signal. The $\Delta\Sigma$ modulator 2 causes a reduction in the amount of quantization noise in the band of the audio signal as the order of a feed back circuit becomes higher.

The switching circuit 3 controls a constant voltage in accordance with the binary PDM signal and causes a current to flow to a voice coil 5 of a speaker 4 so as to drive a diaphragm 6.

Figure 2:
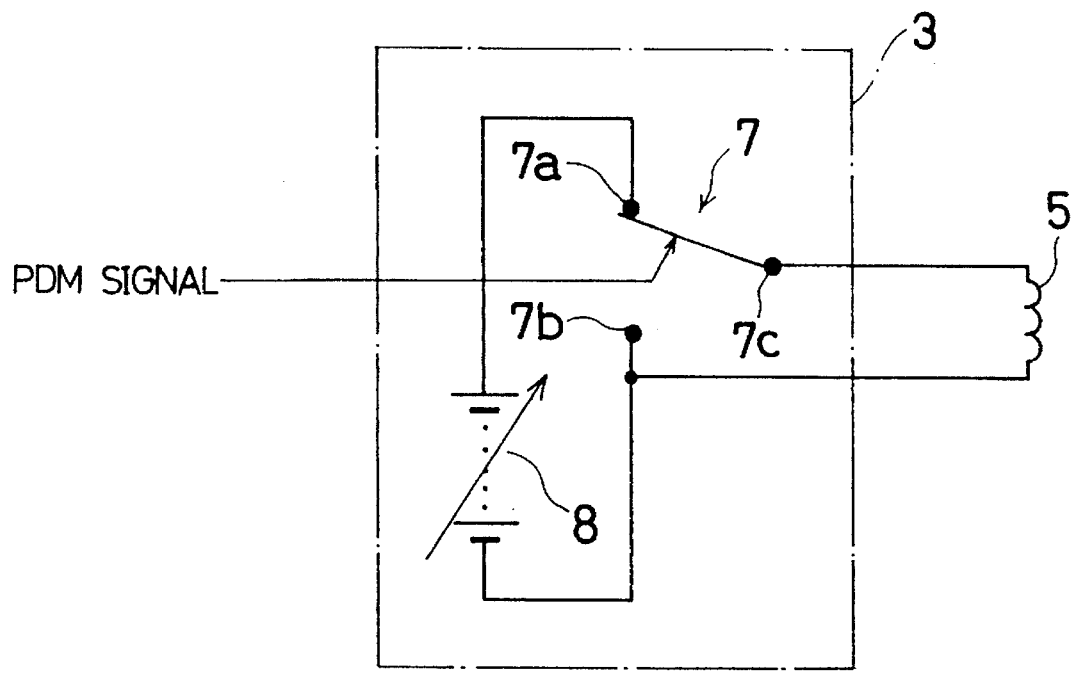
FIG. 2 is a circuit diagram illustrating the structure of a switching circuit in the speaker driving circuit of FIG. 1.

As illustrated in FIG. 2, the switching circuit 3 includes a switch 7 and a power source 8. As for the power source 8 for supplying power to the voice coil 5, a DC power source whose output is variable is employed. The switch 7 as an on-off switch has contacts, 7a and 7b, and an output terminal 7c. The positive contact 7a is connected to the positive output terminal of the power source 8, while the negative contact 7b is connected to the negative output terminal thereof. The output terminal 7c and contact 7b are connected in series with the voice coil 5.

The switch 7 with such a configuration is capable of connecting the output terminal 7c to the contact 7a or the contact 7b in accordance with the binary PDM signal. More specifically, when the binary PDM signal is "1", the contact 7a is connected to the output terminal 7c and when the binary PDM signal is "0", the contact 7b is connected to the output terminal 7c. In a practical circuit the switch 7 is formed by a high-speed electronic switch such as an FET (field effect transistor) or a thyristor.

Figure 4:
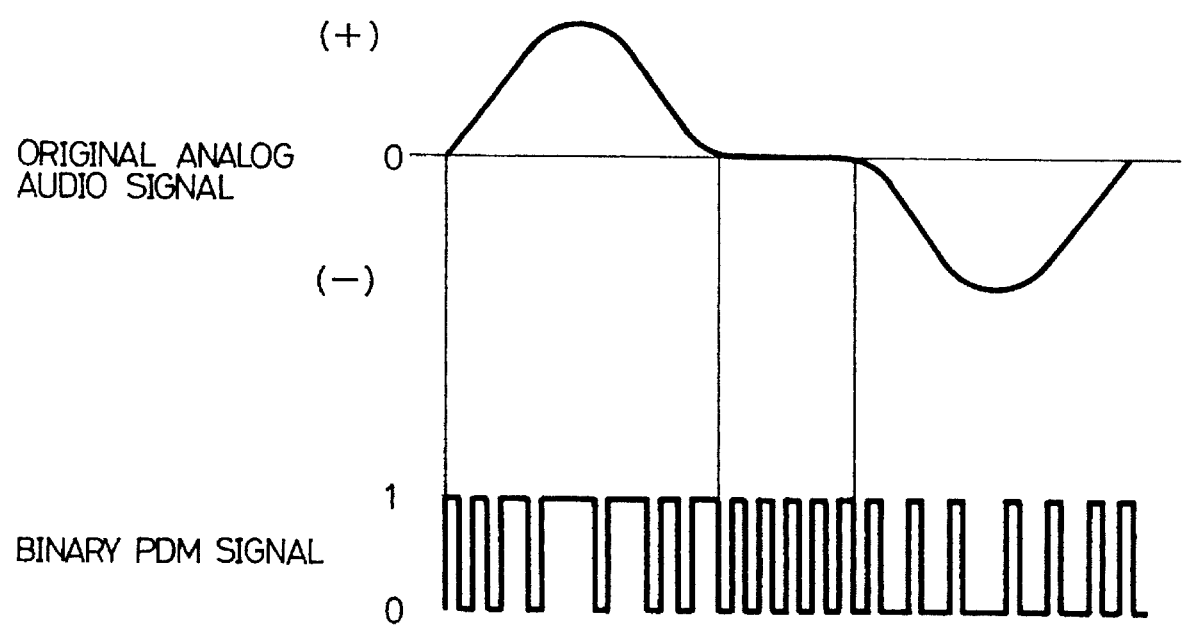
FIG. 4 is a view illustrating the waveforms of an original analog audio signal and a binary PDM signal produced by the speaker driving circuit of FIG. 1.

With the above-mentioned configuration, the digital audio signal input through an input terminal P is over-sampled by the digital low-pass filter 1 and $\Delta\Sigma$-modulated by the $\Delta\Sigma$ modulator 2, and thus noise-shaping is performed. As a result, the binary PDM signal with a pulse density corresponding to the amplitude of the original analog audio signal is produced as illustrated in FIG. 4.

When the binary PDM signal is "1", the switch 7 connects the contact 7a and the output terminal 7c so that the output current from the power source 8 flows via the contact 7a to the voice coil 5. Meanwhile, when the binary PDM signal is "0", the switch 7 connects the contact 7b and the output terminal 7c. Therefore, the voice coil 5 is short-circuited at the contact 7b and the current from the power source 8 does not flow to the voice coil 5.

Since the speaker 4 functions as an acoustic low-pass filter, if the current, which has been digitally switched, flows to the voice coil 5, a driving force proportional to the original analog audio signal is generated. Thus, it is possible to reproduce the analog audio signal by simply inputting into the speaker 4 the current switched in accordance with the binary PDM signal.

In the speaker driving circuit including the switching circuit 3, as described above, the digital audio signal is reproduced by switching the supply of the current to the voice coil 5 on and off in accordance with the binary PDM signal. Therefore, there is no need to provide a D/A converter and an amplification circuit. Consequently, a filter for D/A conversion is not required, decreasing the manufacturing costs of the speaker driving circuit. Furthermore, since it is possible to dispense with the amplification circuit as a heating source, the operation of the circuit is stabilized and the consumption of power decreases.

Next, the following description explains an alternative structure of the speaker driving circuit of this embodiment.

Figure 3:
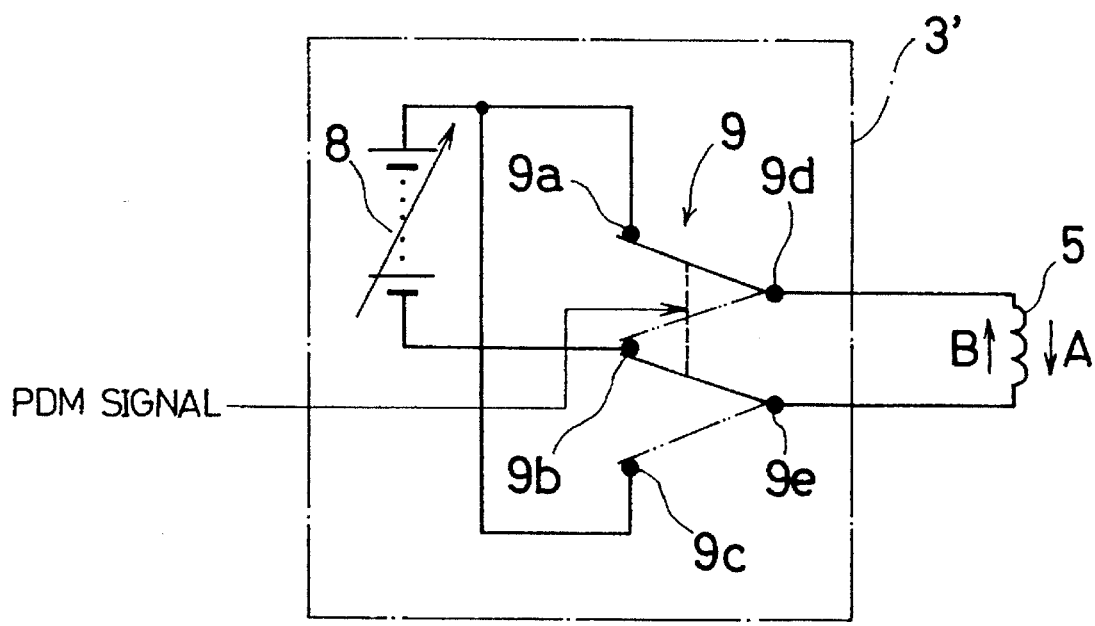
FIG. 3 is a circuit diagram illustrating the structure of an alternative switching circuit for use in the speaker driving circuit of FIG. 1.

As illustrated in FIG. 3, the speaker driving circuit can incorporate a switching circuit 3', instead of the switching circuit 3.

The switching circuit 3' includes a switch 9 as a change-over switch and a power source 8 as shown in FIG. 3. The switch 9 is a bipolar double-throw-type switch, and is formed by a high-speed electronic switch like the switch 7 in the above-mentioned speaker driving circuit. The switch 9 includes contacts, 9a through 9c, and output terminals 9d and 9e. The contact 9a as a first contact and the contact 9c as a second contact are connected to the positive output terminal of the power source 8, while the contact 9b as a third contact is connected to the negative output terminal thereof. The output terminal 9d as a first output terminal and the output terminal 9e as a second output terminal are connected with the voice coil 5.

The switch 9 with such a configuration switches the connections between the voice coil 5 and the contacts 9a to 9c in accordance with the binary PDM signal transmitted from the $\Delta\Sigma$ modulator 2. More specifically, when the binary PDM signal is "1", the contact 9a is connected to the output terminal 9d and the contact 9b is connected to the output terminal 9e as shown by the solid lines in the drawing. Meanwhile, when the binary PDM signal is "0", the contact 9b is connected to the output terminal 9d and the contact 9c is connected to the output terminal 9e as indicated by the alternate long and two short dashes lines.

With this configuration, when the binary PDM signal from the ΔΣ modulator 2 is "1", the output current from the power source 8 flows in the A direction through the contacts 9a and 9b of the switch 9 and the voice coil 5. When the binary PDM signal is "0", on the other hand, the output current from the power source 8 flows in the B direction through the contacts 9b and 9c of the switch 9 and the voice coil 5. As a result, similar to the above-mentioned speaker driving circuit, the binary PDM signal is converted into the analog audio signal and reproduced as sound by the speaker 4.

As described above, in the speaker driving circuit including the switching circuit 3', since the digital audio signal is reproduced by switching the direction of current flowing through the voice coil 5 in accordance with the binary PDM signal, an amplification circuit is not required. Consequently, like the above-mentioned speaker driving circuit, it is possible to decrease the manufacturing costs, to stabilize the operation of the circuit, and to reduce the consumption of power.

The driving forces generated by the respective speaker driving circuits of this embodiment are proportional to a voltage applied to the speaker 4, i.e., the output voltage of the power source 8. Thus, the volume of the reproduced sound is adjusted by changing the value of the voltage.

Next, a second embodiment of the present invention is described below with reference to FIGS. 5 through 7.

Figure 5:
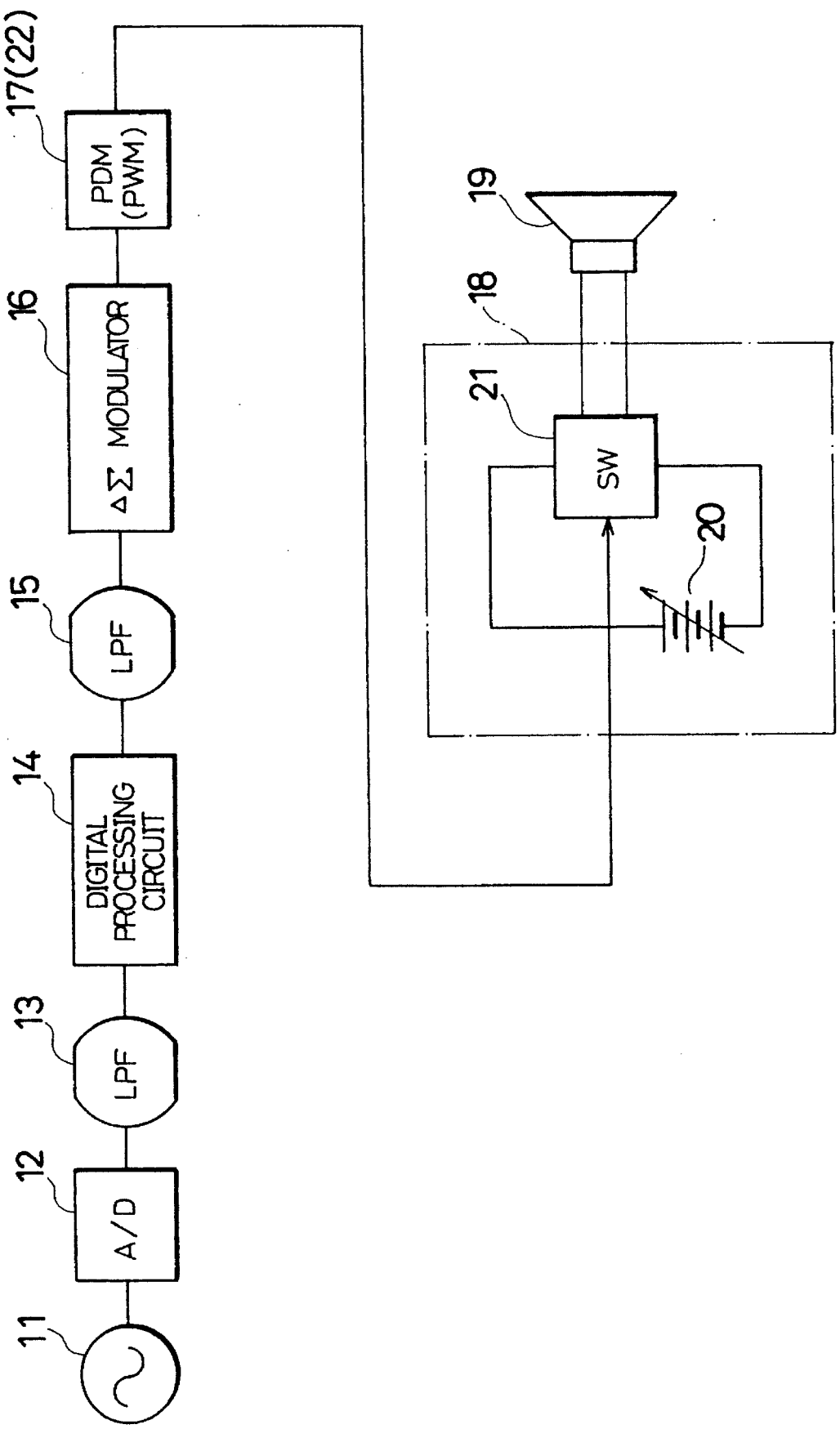
FIG. 5 is a block diagram schematically illustrating the structure of a speaker driving circuit according to the second embodiment of the present invention.

As illustrated in FIG. 5, an audio reproduction apparatus of this embodiment incorporates an analog audio signal source 11, an A/D converter 12 (designated as A/D in the drawing), a digital low-pass filter (LPF) 13, a digital processing circuit 14, a digital low-pass filter (LPF) 15, a ΔΣ modulator 16, a ternary PDM circuit 17 (designated as PDM in the drawing), and a switching circuit 18. The digital low-pass filter 15, ΔΣ modulator 16, ternary PDM circuit 17 and switching circuit 18 form a speaker driving circuit.

The A/D converter 12 converts an analog audio signal transmitted from the analog audio source 11 into a digital audio signal by a quantization bit number of 16 and at a sampling frequency of 48 kHz. In the digital processing circuit 14, the digital audio signal sent from the A/D converter 12 via the digital low-pass filter 13 is processed by performing transmitting, memorizing and digital equalizing operations.

The digital low-pass filter 15 is constituted, for example, by a high-order non-cyclic (FIR) digital filter and performs over-sampling by attenuating components outside the pass band of the digital audio signal.

The ΔΣ modulator 16 is a circuit whose function is similar to that of the ΔΣ modulator 2 of the first embodiment (see FIG. 1). The ΔΣ circuit 16 converts the digital audio signal from the digital low-pass filter 15 into a one-bit binary PDM signal, and changes the form of an output from amplitude variations to time variations.

The ternary PDM circuit 17 as the pulse-density modulator converts the binary PDM signal into a ternary pulse-density-modulated signal (hereinafter referred to as ternary PDM signal) having the digits +1, 0 or −1.

The ternary PDM signal qualitatively has the following characteristics.

(1) In the case where the level of the original analog audio signal is greater than zero, as the level becomes higher, the with which the amplitude of the ternary PDM signal changes from zero and becomes "+1" and the duration it holds the value +1 becomes greater, respectively;

(2) The frequency with which the amplitude of the ternary PDM signal changes to zero increases as the level of the original analog audio signal comes closer to zero; and (3) In the case where the level of the original analog audio signal is less than zero, as the level becomes lower, the frequency with which the amplitude of the ternary PDM signal comes "−1" and the duration it holds the value −1 becomes greater, respectively.

The switching circuit 18 includes a power source 20 and a switch 21 (designated as SW in the drawing), and generates a current to be supplied to a speaker 19 by selecting a constant voltage according to the ternary PDM signal. As for the power source 20 for supplying power to the voice coil (not shown) in the speaker 19, a DC power source whose output is variable is used. Like the switches 7 and 9 of the first embodiment, the switch 21 as a first ternary switch is formed by a high-speed electronic switch.

Figure 6:
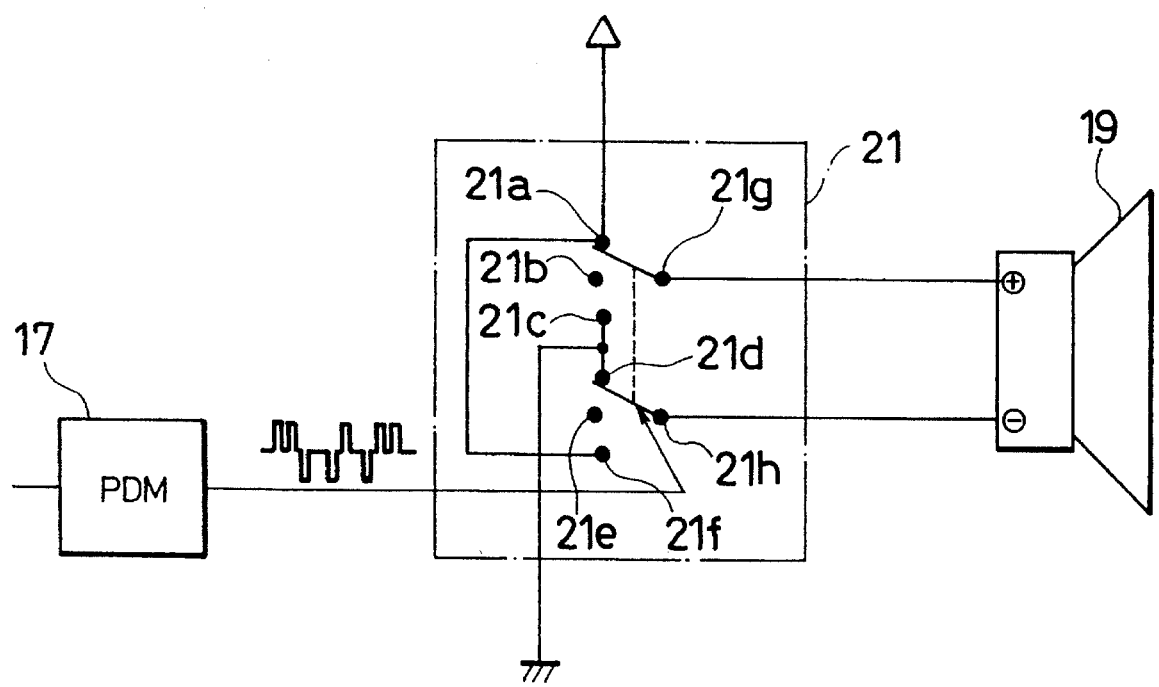
FIG. 6 is a circuit diagram illustrating the structure of a switch incorporated in the switching circuit of the speaker driving circuit of FIG. 5.

As illustrated in FIG. 6, the switch 21 is a bipolar switch and has contacts 21a through 21f and output terminals 21g and 21h. The contact 21a as a first contact and the contact 21f as a second contact are connected to the positive output terminal of the power source 20, while the contacts 21c and 21d as a third contact are connected to the negative output terminal thereof. The contacts 21b and 21e as a fourth contact are open, and the output terminal 21g as a first output terminal and the output terminal 21h as a second output terminal are connected to the positive and negative input terminals of the speaker 19, respectively. The positive and negative input terminals are connected with the voice coil.

The switch 21 of such a configuration switches the connections between the voice coil and the contacts 21a to 21f in accordance with the ternary PDM signal as follows. When the ternary PDM signal is "+1", the contacts 21a and 21d are connected to the output terminals 21g and 21h, respectively. When the ternary PDM signal is "0", the contacts 21b and 21e are connected to the output terminals 21g and 21h, respectively. And, when the ternary PDM signal is "−1", the contacts 21c and 21f are connected to the output terminals 21g and 21h, respectively.

With this configuration, the digital audio signal from the digital low-pass filter 15 is ΔΣ-modulated by the ΔΣ modulator 16, and noise-shaping is performed. Then, a binary signal is produced. Next, the resultant signal is converted into a ternary signal by the ternary PDM circuit 17. Consequently, as shown in FIG. 7, the digital audio signal becomes the ternary PDM signal with a pulse density corresponding to the amplitude of the original analog audio signal.

When the ternary PDM signal is input to the switching circuit 18, the switch 21 is actuated. Namely, when the ternary PDM signal is "+1", a current flows in the positive direction through the voice coil. When the ternary PDM signal is "0", the current does not flow to the voice coil. And, when the ternary PDM signal is "−1", the current flows in the negative direction through the voice coil.

In the speaker 19, by controlling the supplying of current in such a manner, a driving force proportional to the original analog audio signal is generated and the sound is reproduced. At this time, if the upper limit of the reproduction band of the speaker 19 is arranged to be lower than the audible frequency band by the vibration system of the speaker 19, the vibration system functions as the low-pass filter of a conventional driving circuit, located after the D/A converter. Therefore, an analog low-pass filter serving as an electric circuit can be omitted. Thus, the analog audio signal is reproduced by simply inputting into the speaker 19 the current switched by the ternary PDM signal.

This embodiment describes the control of the switching circuit 18 with the ternary PDM signal. However, it is also possible to reproduce the sound in the same manner with a ternary PWM (pulse-width-modulated) signal. In this case, reproduction is carried out by replacing the ternary PDM circuit 17 shown in FIG. 5 with a ternary PWM (pulse-width modulation) circuit 22 (designated as PWM in the drawing). As for the switch 21, it also functions as a ternary PWM (pulse-width-modulation) switch for the PWM signal, it can be used in both the configuration having the ternary PDM circuit 17 and the configuration having the ternary PWM circuit 22.

Moreover, like the first embodiment, the speaker driving circuit of this embodiment is capable of adjusting the volume of the reproduced sound by varying the output voltage of the power source 20. Furthermore, since the ternary signal becomes "0" when the original analog audio signal is "0" due to the characteristic of the ternary signal, the speaker 19 does not consume any power when there is no input signal. Thus, the configuration using the ternary signal achieves a highly-efficient driving operation compared to that using the binary signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speaker driving circuit, comprising:

a direct-current power source for supplying a current to a single voice coil speaker;

a delta sigma modulator for converting a multi-bit digital audio signal into a one-bit pulse density modulated signal having binary "0" or "1" information at a predetermined sampling frequency, said delta sigma modulator having a higher order feedback circuit.; and an on-off switch directly responsive to said delta sigma modulator for switching at said predetermined sampling frequency the supply of the current from the power source to said single voice coil between on and off by directly controlling an output of said direct-current power source in accordance with the binary information from said delta sigma modulator, said coil being connected directly to said switch and said speaker functioning as an acoustic low-pass filter.

2. The speaker driving circuit according to claim 1, wherein said on-off switch is an electronic switch which connects said direct-current power source to said voice coil when the binary information is "1" and short-circuits both ends of said voice coil when the binary information is "0".

3. The speaker driving circuit according to claim 1, wherein said on-off switch includes:

an output terminal;

a positive contact connected to a positive output terminal of said direct-current power source; and a negative contact connected to a negative output terminal of said direct-current power source, wherein said output terminal of said on-off switch is connected to one end of the voice coil and said negative contact is connected to another end of said voice coil, and wherein said positive contact and said output terminal of said on-off switch are connected when the binary information is "1", and said negative contact and said output terminal of said on-off switch are connected when the binary information is "0".

4. The speaker driving circuit according to claim 1, wherein said direct-current power source has a controllable variable output voltage, whereby the volume of reproduced sound is controlled.

5. A speaker driving circuit, comprising:

a direct-current power source having an output for supplying a current to a single voice coil speaker;

a delta sigma modulator for converting a multi-bit digital audio signal into a one-bit pulse density modulated signal having binary "0" or "1" information at a predetermined sampling frequency, said delta sigma modulator having a higher order feedback circuit; and a change-over switch for forming connections between the direct-current power source and said voice coil and being directly responsive to said delta sigma modulator for switching at said predetermined sampling frequency the direction of the current flowing through said single voice coil by changing the connections between the output of said direct-current power source and said voice coil in accordance with the binary information, said coil being connected directly to said switch and said speaker functioning as an acoustic low-pass filter.

6. The speaker driving circuit according to claim 5, wherein said change-over switch includes an electronic switch for inverting the direction of the current flowing through said voice coil in accordance with "1" or "0" of the binary information.

7. The speaker driving circuit according to claim 5, wherein said change-over switch includes:

first and second output terminals, said first output terminal being connected to one end of the voice coil and the second output terminal being connected to another end of said voice coil;

first and second contacts connected to a positive output terminal of said direct-current power source; and a third contact connected to a negative output terminal of said direct-current power source, and wherein said change-over switch connects said first contact and said first output terminal and connects said third contact and said second output terminal when the binary information is "1", and said change-over switch connects said third contact and said first output terminal and connects said second contact and said second output terminal when the binary information is "0".

8. The speaker driving circuit according to claim 5, wherein said direct-current power source has a controllable variable output voltage, whereby the volume of reproduced sound is controlled.

* * * * *